(12) United States Patent
Yamanaka et al.

(10) Patent No.: US 9,796,408 B2
(45) Date of Patent: Oct. 24, 2017

(54) ELECTRIC STEERING DEVICE

(71) Applicant: MITSUBISHI JIDOSHA KOGYO KABUSHIKI KAISHA, Tokyo (JP)

(72) Inventors: Hiroki Yamanaka, Mie (JP); Masayuki Hashiguchi, Obu (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 14/875,283

(22) Filed: Oct. 5, 2015

(65) Prior Publication Data
US 2016/0096544 A1   Apr. 7, 2016

(30) Foreign Application Priority Data
Oct. 6, 2014   (JP) .................................. 2014-205504

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G05D 1/00* (2006.01)
*G06F 7/00* (2006.01)
*G06F 17/00* (2006.01)
*G06F 19/00* (2011.01)
*B62D 5/04* (2006.01)

(52) U.S. Cl.
CPC ......... *B62D 5/0463* (2013.01); *B62D 5/0481* (2013.01)

(58) Field of Classification Search
CPC ............................ B62D 5/0463; B62D 5/0481
USPC ......................................................... 701/1, 41
See application file for complete search history.

(56) References Cited

U.S. PATENT DOCUMENTS

| 5,339,243 A | * | 8/1994 | Matsuoka | ............. B62D 5/049 180/446 |
| 5,913,913 A | * | 6/1999 | Okanoue | ............. B62D 5/0484 180/404 |
| 6,032,091 A | | 2/2000 | Noro et al. | |
| 6,223,852 B1 | * | 5/2001 | Mukai | ................. B62D 5/0463 180/443 |

(Continued)

FOREIGN PATENT DOCUMENTS

DE   102013018070 A1   6/2014
EP       0805095 A2   11/1997

(Continued)

*Primary Examiner* — Jaime Figueroa
(74) *Attorney, Agent, or Firm* — Birch, Stewart, Kolasch & Birch, LLP

(57) ABSTRACT

An electric steering device includes an electric actuator which generates a steering assist force for a steering mechanism of a vehicle, a control unit which controls the steering assist force generated from the electric actuator based on an operation of a steering wheel by a driver, an ignition signal detection unit which detects presence or absence of an ignition signal of the vehicle, and a speed acquisition unit which acquires a running speed of the vehicle. In a case that the ignition signal is not detected and the running speed is a predetermined speed or more, the control unit reduces an upper limit of the steering assist force generated from the electric actuator so as to be smaller than an upper limit in a case that the ignition signal is detected.

14 Claims, 9 Drawing Sheets

(56) References Cited

U.S. PATENT DOCUMENTS

| | | | | |
|---|---|---|---|---|
| 6,390,229 B1* | 5/2002 | Kaji | .................... | B62D 5/0463 |
| | | | | 180/443 |
| 6,857,496 B2* | 2/2005 | Williams | ................ | B60R 25/02 |
| | | | | 180/287 |
| 7,095,191 B2* | 8/2006 | Sakurai | .................... | B60K 6/26 |
| | | | | 318/139 |
| 8,418,801 B2* | 4/2013 | Izutani | .................. | B62D 5/046 |
| | | | | 180/446 |
| 8,950,520 B2* | 2/2015 | Hauser | .................... | B62D 3/02 |
| | | | | 180/6.24 |
| 9,409,595 B2* | 8/2016 | Varunjikar | ........... | B62D 5/0484 |
| 2004/0148078 A1* | 7/2004 | Nakano | .................. | B60C 23/00 |
| | | | | 701/41 |
| 2006/0042859 A1* | 3/2006 | Itoh | ........................ | B62D 5/003 |
| | | | | 180/402 |
| 2011/0071730 A1* | 3/2011 | Nakai | .................. | B62D 5/0481 |
| | | | | 701/42 |
| 2014/0081525 A1* | 3/2014 | Itamoto | ................ | B62D 5/0484 |
| | | | | 701/42 |
| 2014/0350788 A1 | 11/2014 | Byun | | |
| 2015/0025743 A1* | 1/2015 | Tamura | .................. | B62D 5/046 |
| | | | | 701/41 |
| 2015/0115740 A1* | 4/2015 | Miura | .................... | H01H 47/00 |
| | | | | 307/117 |
| 2015/0203152 A1 | 7/2015 | Katayama et al. | | |

FOREIGN PATENT DOCUMENTS

| | | |
|---|---|---|
| EP | 1072498 A2 | 1/2001 |
| JP | 2000-128009 A | 5/2000 |

\* cited by examiner

ELECTRIC STEERING DEVICE

BACKGROUND

The present invention relates to an electric steering device for assisting a steering operation of a vehicle.

An electric steering device has been known which generates a steering assist force using an electric actuator for assisting a steering operation, that is, an operation of a steering wheel of a vehicle.

As the electric steering device is driven by electric power, driving of the electric steering device is stopped when a power supply system of a vehicle is turned off. When driving of the electric steering device is stopped, as a driver performs a steering operation without a steering assist force, the steering operation is required to be performed with a larger force than usual.

A patent literature 1 discloses a technique which includes a detection unit for detecting a turning-on/off of a power supply switch of a vehicle and a determination unit for determining whether or not a running speed of the vehicle is lower than a predetermined speed. In this technique, in a case that the detection unit detects the turning-off of the power supply switch, power supply to a steering device for the vehicle is stopped only when the determination unit determines that the running speed is lower than the predetermined speed.

[Patent Literature 1] JP-A-2000-128009

In this related art, for example, even in a case that the power supply switch is erroneously turned off during running of the vehicle or the detection unit for detecting a state of the power supply switch becomes failure, it is possible to continuously drive the steering device for the vehicle to generate the steering assist force similar to that in the normal state. Thus, if the aforesaid erroneous operation, failure or the like occurs, it is possible to avoid occurrence of such a phenomenon that a steering wheel suddenly becomes heavy, that is, a force required for operating the steering wheel suddenly becomes large, during running of the vehicle and hence the steering operation becomes difficult.

However, the aforesaid related art has a problem that the driver is hard to notice the erroneous operation or failure.

Therefore, the invention, having been contrived bearing in mind the heretofore described circumstances, has for its object to provide an electric steering device which enables a driver to easily notice an erroneous operation with respect to a vehicle and a failure of a power supply system while maintaining steering performance of the vehicle.

SUMMARY

According to an embodiment of the present invention, there is provided an electric steering device comprising:

an electric actuator which generates a steering assist force for a steering mechanism of a vehicle, a control unit which controls the steering assist force generated from the electric actuator based on a steering operation by a driver, an ignition signal detection unit which detects presence or absence of an ignition signal of the vehicle, and a speed acquisition unit which acquires a running speed of the vehicle, wherein, in a case that the ignition signal is not detected and the running speed is equal to or larger than a predetermined speed, the control unit reduces an upper limit of the steering assist force generated from the electric actuator so as to be smaller than an upper limit in a case that the ignition signal is detected.

DETAILED DESCRIPTION OF EXEMPLIFIED EMBODIMENTS

Hereinafter, an electric steering device according to an embodiment of the invention will be explained in detail with reference to accompanying drawings.

Figure 1:
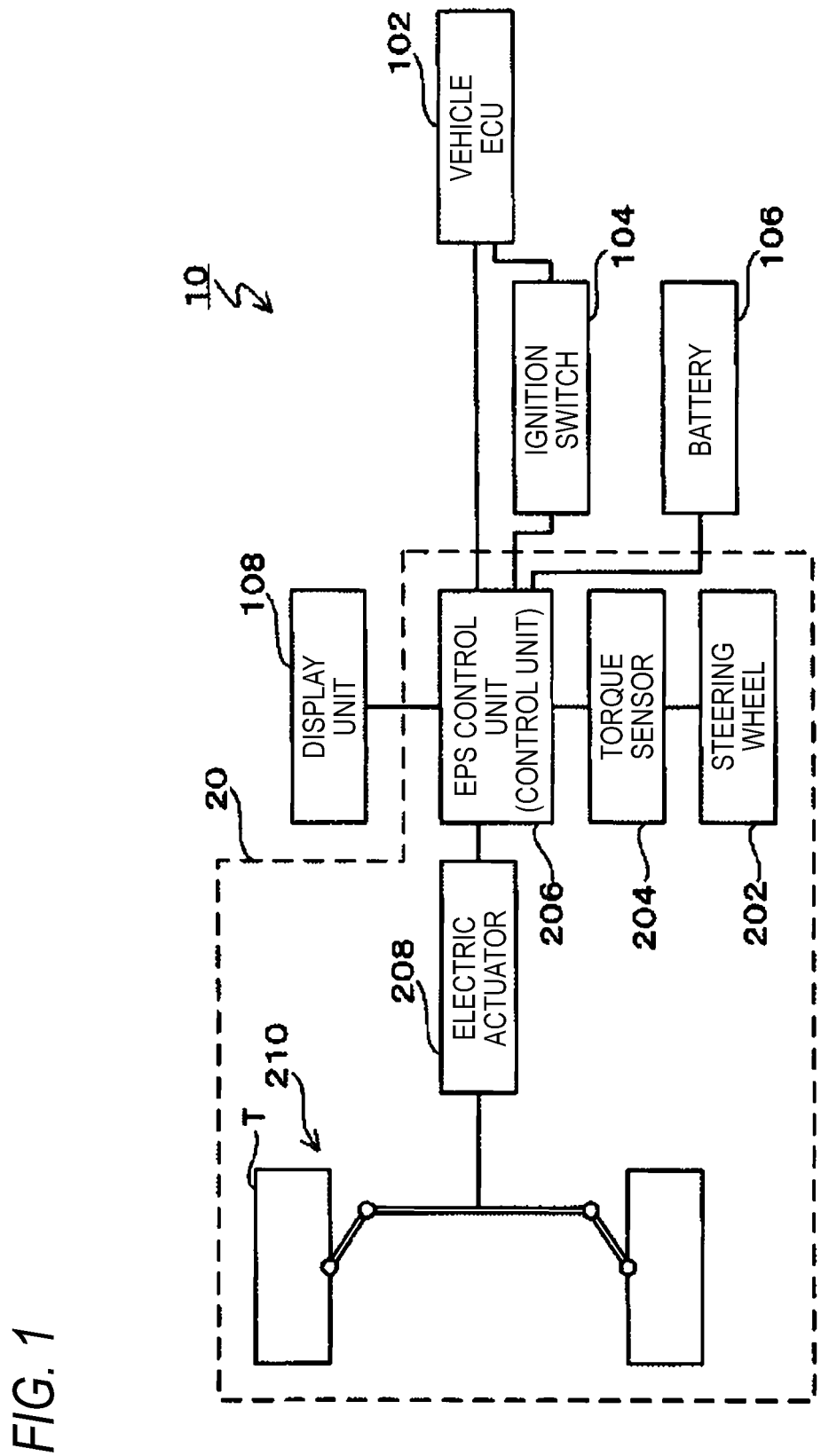
FIG. 1 is a block diagram showing configuration of an electric steering device 20 according to an embodiment.

FIG. 1 is a block diagram showing configuration of an electric steering device 20 according to the embodiment.

The electric steering device 20 according to the embodiment is mounted in a vehicle 10 and configured by including a steering wheel 202, a torque sensor 204, an EPS (Electric Power Steering) control unit 206 and an electric actuator 208.

The steering wheel 202 is provided at a driver's compartment and accepts a steering operation, that is, an operation of the steering wheel of a driver.

The torque sensor 204 detects an amount of steering operation with respect to the steering wheel 202 and outputs the detected amount as a torque value.

The EPS control unit 206 is a microcomputer which is configured by including a CPU, an ROM for storing control program, and so on, an RAM acting as an operation area for the control program, an EEPROM for holding various kinds of data so as to be rewritable, an interface part acting as an interface with a peripheral circuit etc., and so on. The EPS control unit constitutes control means recited in claims.

The EPS control unit 206 controls a steering assist force, generated by the electric actuator 208 described later, based on a steering operation of a driver.

The electric actuator 208 is driven by electric power stored in a battery 106 to generate a steering assist force applied to a steering mechanism 210 of a vehicle. Although various types are known as the steering mechanism 210, the steering mechanism is configured by including tie rods, knuckle arms, a rack, a pinion gear, and so on and changes a direction of tires T.

The vehicle 10 is configured by including a vehicle ECU 102, an ignition switch 104, the battery 106 and a display unit 108.

The vehicle ECU 102 is a microcomputer which is configured by including a CPU, an ROM for storing control program, and so on, an RAM acting as an operation area for the control program, an EEPROM for holding various kinds of data so as to be rewritable, an interface part acting as an interface with a peripheral circuit etc., and so on. The vehicle ECU controls entirety of the vehicle 10.

In this embodiment, the vehicle ECU 102 outputs data representing a running speed of the vehicle 10 to the EPS control unit 206.

The ignition switch 104 detects an operation of an engine key by a driver and outputs a signal representing the detection result. In general, the ignition switch 104 detects four kinds of operation states, that is, "OFF", "ACC", "ON" and "START". "OFF" represents a state that the engine key is detachable from a key cylinder and the ignition switch 104 has not been operated yet. "ACC" represents a state that an engine has not been started yet but electric power is supplied to a part of electric equipments (a car navigation equipment, a vehicle air conditioner, and so on) within the vehicle 10. "ON" represents a state that after the engine key is once operated to a "START" position to start the engine, the engine key is stayed at this position. Thus, in this state, the engine is driven and electric power is supplied to all the electric equipments within the vehicle 10.

An ignition signal described later is a signal outputted from the ignition switch 104 in a case that the engine key locates at an "ON" position.

The electric steering device 20 (in particular, the electric actuator 208) is usually operated when the ignition switch 104 is in the "ON" state, that is, when the ignition signal in an ON state is outputted.

Incidentally, in this embodiment, explanation is made that a start operation of the vehicle 10 is performed by operating the engine key. However, in a case that the start operation of the vehicle 10 is performed by operating a start switch, an IG (ignition) signal is outputted from an OSS (One-touch Start System) ECU in place of the ignition switch 104.

The battery 106 stores power for driving the electric equipments within the vehicle 10. The electric actuator 208 is one of the electric equipments driven by electric power supplied from the battery 106. Specifically, electric power stored in the battery 106 is supplied to the electric actuator 208 via the EPS control unit 206. The EPS control unit 206 controls a current supplied to the electric actuator 208, thereby controlling an output of the electric actuator 208.

Power stored in the battery 106 is also supplied to the vehicle ECU 102, the display unit 108, the EPS control unit 206, and so on so as to drive them. Wirings to these electric equipments are omitted in the drawing.

The display unit 108 is provided in the vicinity of a dashboard of the driver's compartment and displays various kinds of information with respect to a driver. In this embodiment, the display unit 108 displays at least information (an alarm lamp, for example) representing a failure of the electric steering device 20.

Figure 2:
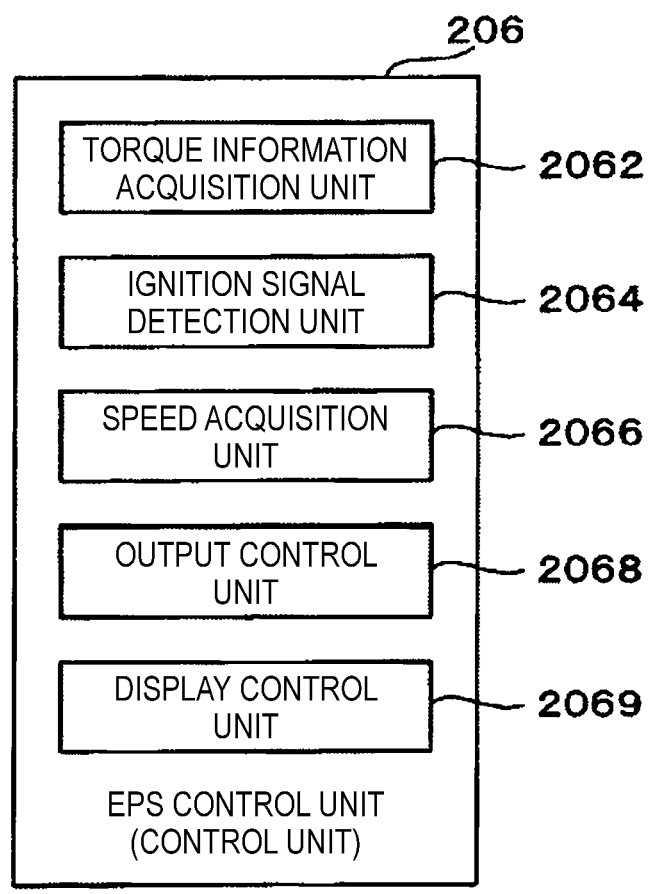
FIG. 2 is a block diagram showing functional configuration of an EPS control unit 206.

FIG. 2 is a block diagram showing functional configuration of the EPS control unit 206.

The EPS control unit 206 realizes a torque information acquisition unit 2062, an ignition signal detection unit 2064, a speed acquisition unit 2066, an output control unit 2068 and a display control unit 2069, when the CPU executes the control program.

The torque information acquisition unit 2062 acquires a torque value representing an amount of steering operation outputted from the torque sensor 204.

The ignition signal detection unit 2064 detects presence or absence (ON or OFF) of the ignition signal of the vehicle 10 outputted from the ignition switch 104.

The speed acquisition unit 2066 acquires data representing a running speed of the vehicle 10 outputted from the vehicle ECU 102. A running speed of the vehicle 10 may be acquired from, for example, an ABS (Antilock Brake System) as well as the vehicle ECU 102. This is because, in a case of the vehicle 10 mounting the ABS thereon, a running speed acquired from the ABS is closer to an actual value than a running speed acquired from the vehicle ECU 102.

The output control unit 2068 determines a steering assist force based on a torque value acquired by the torque information acquisition unit 2062 and controls a driving direction, a driving speed, and so on of the electric actuator 208.

In a case that the ignition signal of the vehicle 10 is not detected and a running speed of the vehicle 10 is a predetermined speed or more, the output control unit 2068 reduces an upper limit of a steering assist force generated from the electric actuator 208 so as to be smaller than an upper limit in a case that the ignition signal is detected.

As described above, usually, the electric steering device 20 operates when the ignition signal is in the ON state, that is, the ignition signal is detected. Thus, for example, during running of the vehicle 10, if the ignition signal is interrupted by erroneously shifting the engine key to an "OFF" or "ACC" position or erroneously pushing the start switch, the operation of the electric steering device 20 is stopped. As a result, suddenly the steering wheel may become heavy or the steering operation may become difficult. Further, for example, during running of the vehicle 10, if a wiring between the ignition switch 104 and the EPS control unit 206 is damaged and hence the EPS control unit 206 cannot detect the ignition signal, if the ignition switch 104 (or the vehicle ECU 102) becomes failure, or if an ignition recognition circuit of the EPS control unit 206 becomes failure, the operation of the electric steering device 20 is also stopped.

On the other hand, if the electric steering device 20 is driven like the normal state in a situation that the ignition signal cannot be detected, a driver may not be able to notice a trouble (the aforesaid erroneous operation or failure) of the vehicle 10. Thus, another trouble such as battery exhaustion may further occur.

In view of this, in the electric steering device 20 according to the invention, even if the ignition signal is not detected during running of the vehicle 10 (running speed is equal to or higher than the predetermined speed), the electric actuator 208 is continuously driven. Further, the upper limit of a steering assist force being generated is reduced so as to be smaller than the case that the ignition signal is detected. As a result, a driver can easily notice the trouble of the vehicle 10.

In this manner, in a case of continuously driving the electric actuator 208 in a situation that the ignition signal cannot be detected, the display control unit 2069 displays the alarm lamp or the like on the display unit 108 so that a driver can more easily notice the trouble.

Figure 3:
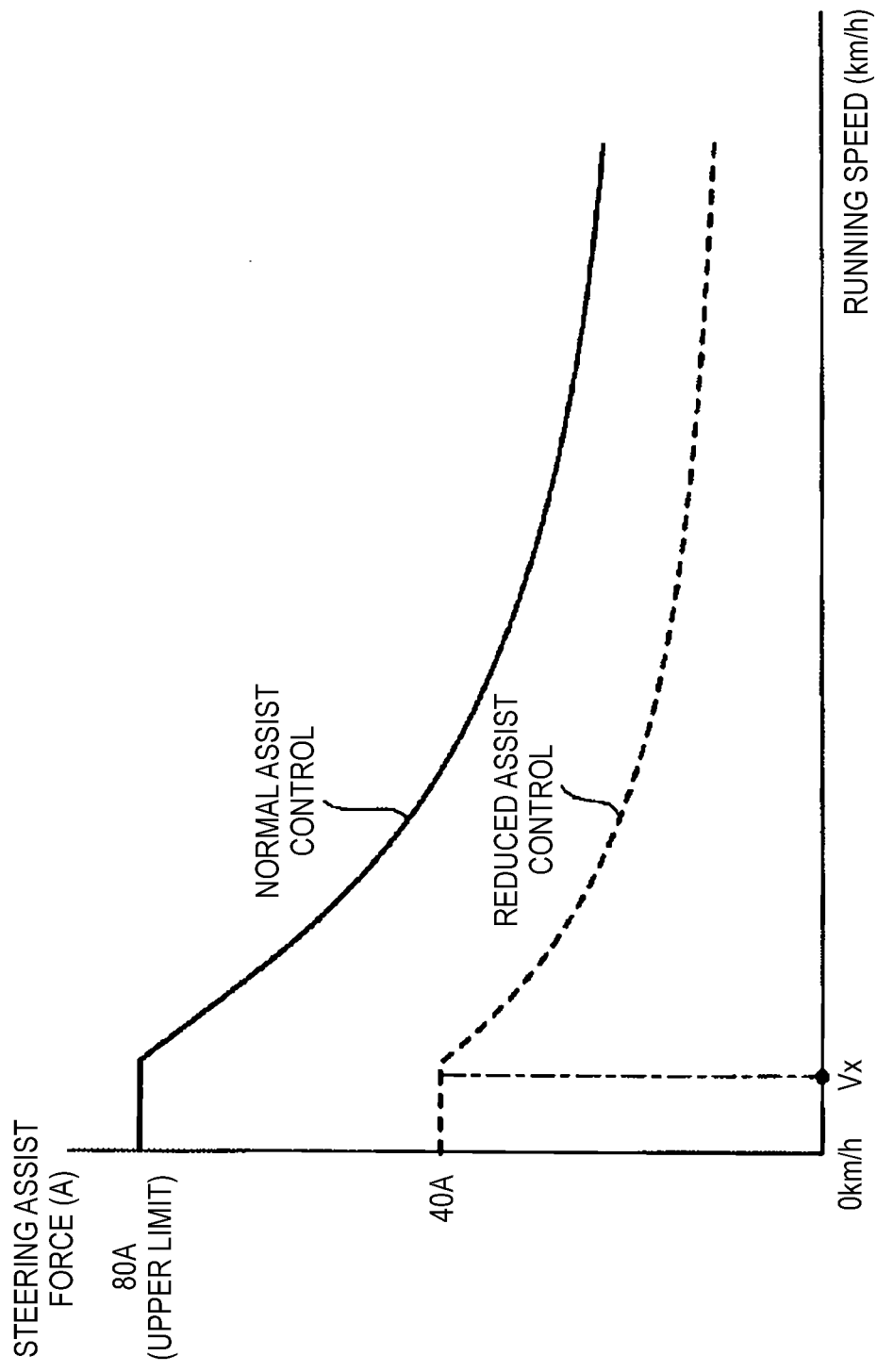
FIG. 3 is a graph showing a relation between a steering assist force and a running speed of a vehicle 10

FIG. 3 is a graph showing a relation between a steering assist force and a running speed of the vehicle 10.

In FIG. 3, an ordinate shows a current value (ampere) supplied to the electric actuator 208, as a value representing a steering assist force. An abscissa shows a running speed (km/h) of the vehicle 10.

A steady line shows a steering assist force in a state of normal assist control (in a case that the ignition signal is detected). A dotted line shows a steering assist force in a case that the ignition signal of the vehicle 10 is not detected and a running speed of the vehicle 10 is the predetermined speed or more.

The control "in the case that the ignition signal of the vehicle 10 is not detected and a running speed of the vehicle 10 is the predetermined speed or more" shown by the dotted line is called "reduced assist control" because a steering assist force is reduced than the case of the normal assist control.

The running speed (predetermined speed) as a threshold value, for determining whether or not the assist control shifts to the reduced assist control, is shown by Vx in the abscissa of FIG. 3. Thus, in the curved dotted line representing the reduced assist control, actually a steering assist force is not generated on the left side than Vx (0 km/h side). However, the dotted line is shown on the left side than Vx merely for convenience of explanation.

As shown in FIG. 3, the output control unit 206B changes a steering assist force depending on a running speed of the vehicle 10.

Specifically, a steering assist force is made maximum in a low running speed range near 0 km/h. Further, the higher a running speed is, the smaller a steering assist force is made. Thus, the upper limit of a steering assist force is a steering assist force at a running speed near 0 km/h.

In the case that the ignition signal is not detected and a running speed is the predetermined speed or more, the output control unit 206B multiplies the upper limit of a steering assist force, generated in the case that the ignition signal is detected, by a correction coefficient smaller than 1. By doing so, the upper limit is reduced than the case that the ignition signal is detected (in the case of normal assist control).

In the example shown in FIG. 3, although the upper limit of a steering assist force is 80 A, this value is multiplied by the correction coefficient of 0.5 (<1) and reduced to 40 A. The correction coefficient is not limited to 0.5 but may be any value in a range larger than 0 and smaller than 1.

As a result, a driver feels that the steering wheel is heavy, that is, a force required for operating the steering wheel is larger than the case of normal assist control. Thus, a driver can easily notice that any troubles occurs in the vehicle 10 due to a sense of incongruity.

As shown in FIG. 3, the output control unit 206B changes a steering assist force depending on a running speed. Simultaneously, the output control unit multiplies a steering assist force generated at each of respective running speeds by the correction coefficient, thereby reducing the steering assist force generated at each of the respective running speeds than the case that the ignition signal is detected (in the case of normal assist control).

In the example shown in FIG. 3, as a steering assist force at each of the respective running speeds is multiplied by the correction coefficient of 0.5, the steering assist force is suppressed to 50% as a whole as compared with the case of normal assist control.

In this manner, as a steering assist force at each of the respective running speeds is multiplied by the uniform correction coefficient, it becomes possible to prevent occurrence of such a phenomenon that, when a running speed changes, a steering assist force changes excessively to impair steering stability.

The correction coefficient, by which a steering assist force at each of the respective running speeds is multiplied, may not be uniform. For example, the correction coefficient may be changed depending on a running speed. As an example, the higher a running speed is, the larger the correction coefficient may be made. Alternatively, the lower a running speed is, the smaller the correction coefficient may be made. As another example, the larger an amount of deviation of a running speed from the current running speed of the vehicle 10 is, the larger (or smaller) the correction coefficient may be made.

As still another example, a steering assist force in a state of the reduced assist control may be determined by subtracting a constant value uniformly, from the steering assist force in a state of the normal assist control, at each of the respective running speeds.

Such the reduced assist control may be terminated, for example, after continuing this control for a predetermined time, thus stopping generation of a steering assist force.

That is, if a situation that the ignition signal is not detected and a running speed is the predetermined speed or more is continued for a predetermined time or more, the output control unit 206B may control the electric actuator 208 to stop generation of a steering assist force.

This is because, in a case that a driver continues a driving without noticing a trouble of the vehicle 10 even in the state of the reduced assist control, the driver can more likely notice the trouble of the vehicle 10 by making the steering wheel heavier.

Further, for example, if a running speed acquired from the vehicle ECU 102 is erroneous, the reduced assist control may be continued despite that the vehicle 10 is stopped actually. If such a situation continues, a charged amount of the battery 106 may reduce and then battery exhaustion may occur. In order to avoid such a phenomenon, the reduced assist control may be terminated after continuing this control for the predetermined time.

Figure 4:
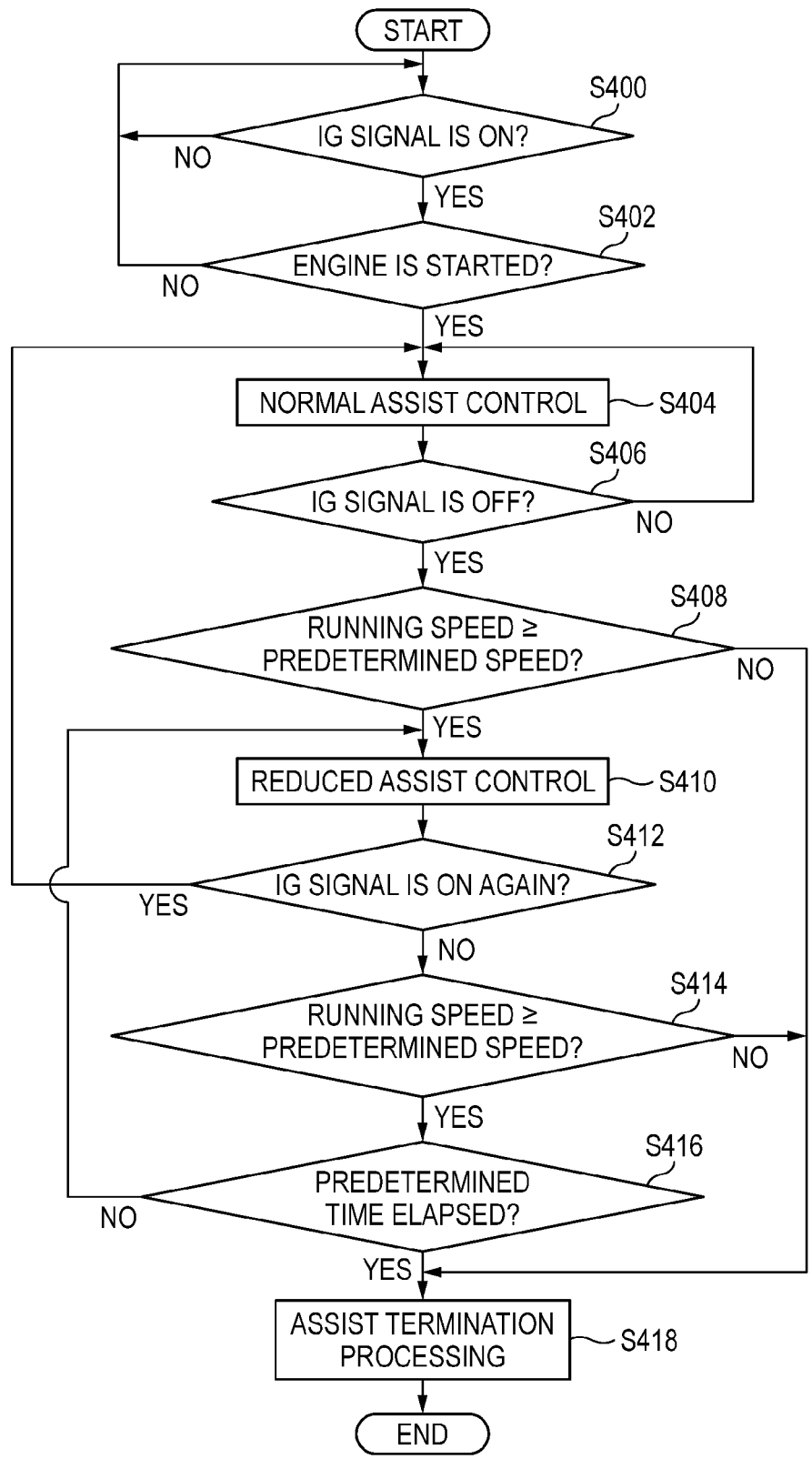
FIG. 4 is a flowchart showing a procedure of control processing of the electric steering device 20 performed by the EPS control unit 206.

FIG. 4 is a flowchart showing a procedure of control processing of the electric steering device 20 performed by the EPS control unit 206.

In the flowchart shown in FIG. 4, firstly the EPS control unit 206 determines whether or not the ignition (IG) signal of the vehicle 10 is detected (ON) (step S400) and whether or not the engine is started (step S402).

When the ignition signal is not detected (No in step S400) or the engine is not started (No in step S402), the processing is placed in a standby mode.

When the ignition signal is detected (Yes in step S400) and the engine is started (Yes in step S402), the normal assist control shown in FIG. 3 is performed (step S404).

After starting the normal assist control in step S404, the EPS control unit 206 always determines whether or not the ignition signal is detected (step S406). While the ignition signal is detected (No in step S406), the processing returns to step S404 and the normal assist control is continued.

In contrast, when the ignition signal is not detected (OFF) (Yes in step S406), the EPS control unit 206 determines whether or not a current running speed of the vehicle 10 is the predetermined speed or more (step S408). When the running speed of the vehicle 10 is not the predetermined speed or more (No in step S408), it is determined that the vehicle 10 is stopped and an assist termination processing is performed (step S418). Thus, the processing of this flowchart is terminated.

The assist termination processing includes gradual reduction of a steering assist force generated by the electric actuator 208, stop of driving of the electric actuator 208, a storing processing of various kinds of settings, and so on.

In contrast, when the running speed of the vehicle 10 in step S408 is the predetermined speed or more (Yes in step S408), the reduced assist control is performed as shown by the dotted line in FIG. 3 (step S410). After starting the reduced assist control in step S410, the EPS control unit 206 determines whether or not the ignition signal is detected (ON) again (step S412). When the ignition signal is detected again (Yes in step S412), the processing returns to step S404 and the normal assist control is performed.

When a running speed of the vehicle 10 reduces lower than the predetermined speed during the reduced assist control (No in step S414), it is determined that the vehicle 10 is stopped and then the assist termination processing is performed (step S418). Thus, the processing of this flowchart is terminated.

Until the predetermined time elapses after starting the reduced assist control (No in step S416), the EPS control unit 206 returns the processing to step S410 and continues the reduced assist control. Then, when the predetermined time elapses after starting the reduced assist control (Yes in step S416), the assist termination processing is performed (step S418). Thus, the processing of this flowchart is terminated.

More detail operations of the electric steering device 20 will be explained with reference to timing charts.

FIGS. 5 to 8 are timing charts showing the operations of the electric steering device 20 according to the invention.

Figure 5:
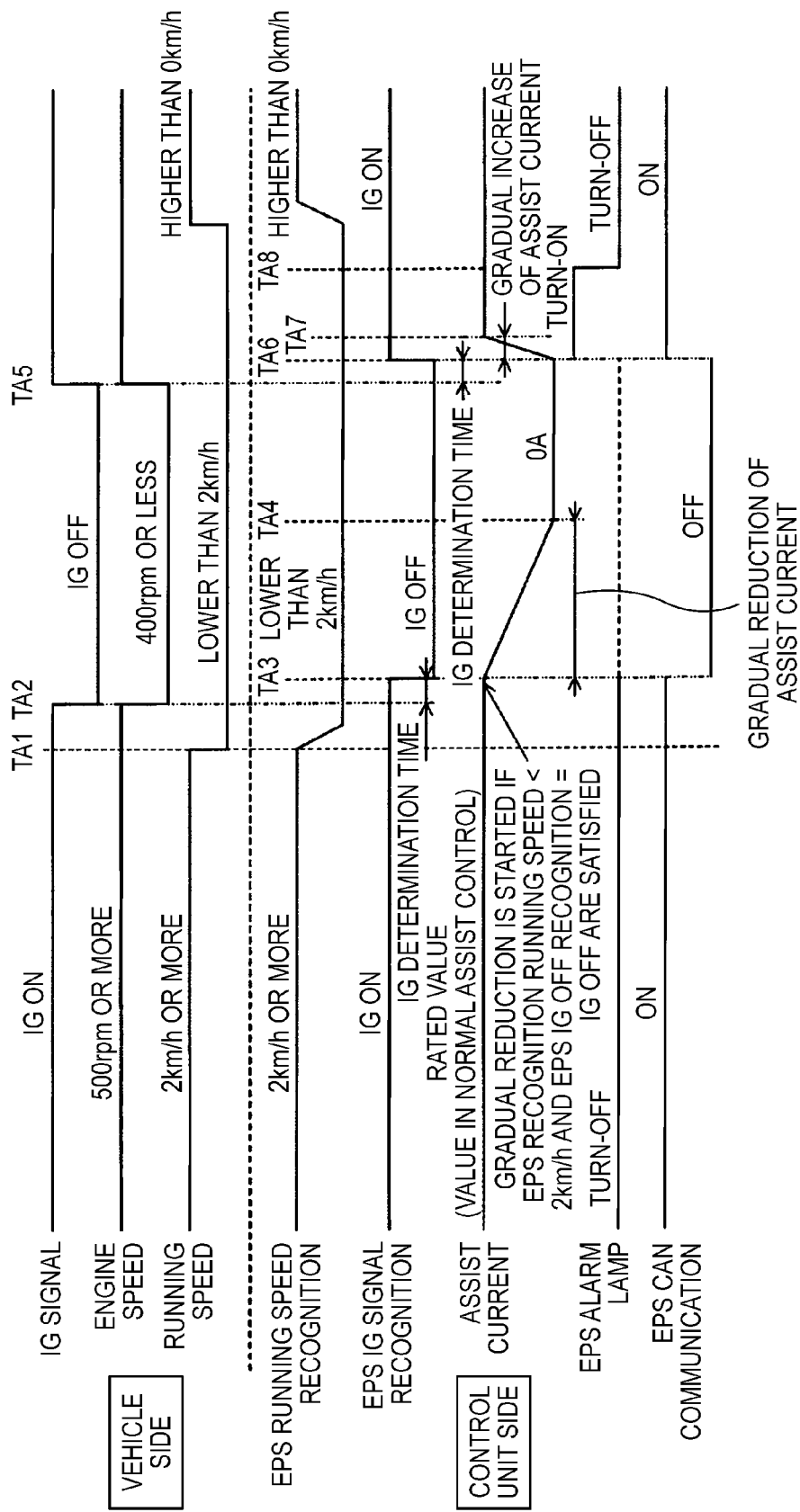
FIG. 5 is a timing chart showing an operation of the electric steering device 20 according to the invention.

The timing chart of FIG. 5 shows a normal stop operation in which the ignition signal is switched off after the vehicle 10 stops.

FIG. 5 shows, as information on the vehicle 10 side, ON/OFF of the ignition (IG) signal, an engine speed and a running speed. The ON/OFF of the ignition signal represents ON/OFF states of the ignition signal outputted from the ignition switch 104, respectively. An engine speed and a running speed represent information outputted from the vehicle ECU 102.

Further, FIG. 5 shows, as information on the EPS control unit 206 (control unit) side, a recognition state of a running speed, a recognition state of presence or absence of the ignition (IG) signal, an upper limit of supply current (assist current) to the electric actuator 208, a display state of the alarm lamp on the display unit 108 and an approval/disapproval of CAN communication in the EPS control unit 206. The recognition state of a running speed represents a running speed acquired by the speed acquisition unit 2066. The recognition state of presence or absence of the ignition signal represents a detection result of the ignition signal detection unit 2064. The upper limit of supply current (assist current) to the electric actuator 208 represents a supply current to the electric actuator 208 controlled by the output control unit 2068. The display state of the alarm lamp on the display unit 108 represents turned-on or off of the alarm lamp by the display control unit 2069. The approval/disapproval of the CAN communication in the EPS control unit 206 represents an activation state of the EPS control unit 206.

In an initial situation shown in FIG. 5, the vehicle 10 is in a normal running state. That is, the ignition signal of the vehicle 10 side is in the ON state, an engine speed is 500 rpm or more and a running speed is 2 km/h or more. Further, the recognition state of a running speed in the EPS control unit 206 (control unit) is 2 km/h or more, the recognition state of presence or absence of the ignition signal is ON (presence), the upper limit of supply current to the electric actuator 208 is a rated value (value in the normal assist control), the display state of the alarm lamp is turned-off and the CAN communication in the EPS control unit 206 is in an ON (approval) state.

In the following explanation, a running speed (predetermined speed), as a threshold value for determining whether or not the processing proceeds to the reduced assist control, is 2 km/h.

When a running speed recognized on the vehicle 10 side becomes lower than 2 km/h at a time point TA1, the recognition state of a running speed on the EPS control unit 206 side also becomes lower than 2 km/h in linkage therewith. Thereafter, when the ignition switch 104 is turned off at a time point TA2, the ignition signal is switched off and hence the engine is stopped. In this respect, the engine can be considered to be in a stopped state when an engine speed is 400 rpm or less.

The ignition signal detection unit 2064 recognizes, at a time point TA3 (time point TA2+IG determination time) upon lapse of a predetermined determination time (IG determination time) after the ignition signal outputted from the ignition switch 104 is switched off, that the ignition signal is switched off.

In this case, as the recognition state of a running speed on the EPS control unit 206 side also becomes lower than 2 km/h, the assist termination processing is started. That is, a current supplied to the electric actuator 208 is reduced gradually after the time point TA3 and becomes 0 A at a time point TA4. Further, the EPS control unit 206 switches the CAN communication in an OFF (disapproval) state at the time point TA3. As the CAN communication is in the OFF state, display control on the display unit 108 can also not be performed (dotted line in the drawing).

Thereafter, when the ignition switch 104 is turned on again at a time point TA5, the ignition signal is switched on. Thus, the engine is started and an engine speed is increased to 500 rpm or more. The recognition state of the ignition signal on the EPS control unit 206 side becomes ON at a time point TA6 upon lapse of the IG determination time after the time point TA5. In linkage with this, a current supplied to the electric actuator 208 is increased gradually and reaches the rated value at a time point TA7. Further, the EPS control unit 206 switches the CAN communication in the ON state. The display control unit 2069 switches the alarm lamp of the display unit 108 in the turned-on state for initial checking for a constant time (from the time point TA6 to a time point TA8).

Thereafter, the vehicle 10 starts running and the normal assist control is performed. The timing chart of FIG. 6 shows an operation in a case that the ignition signal is switched off during running of the vehicle 10.

Figure 6:
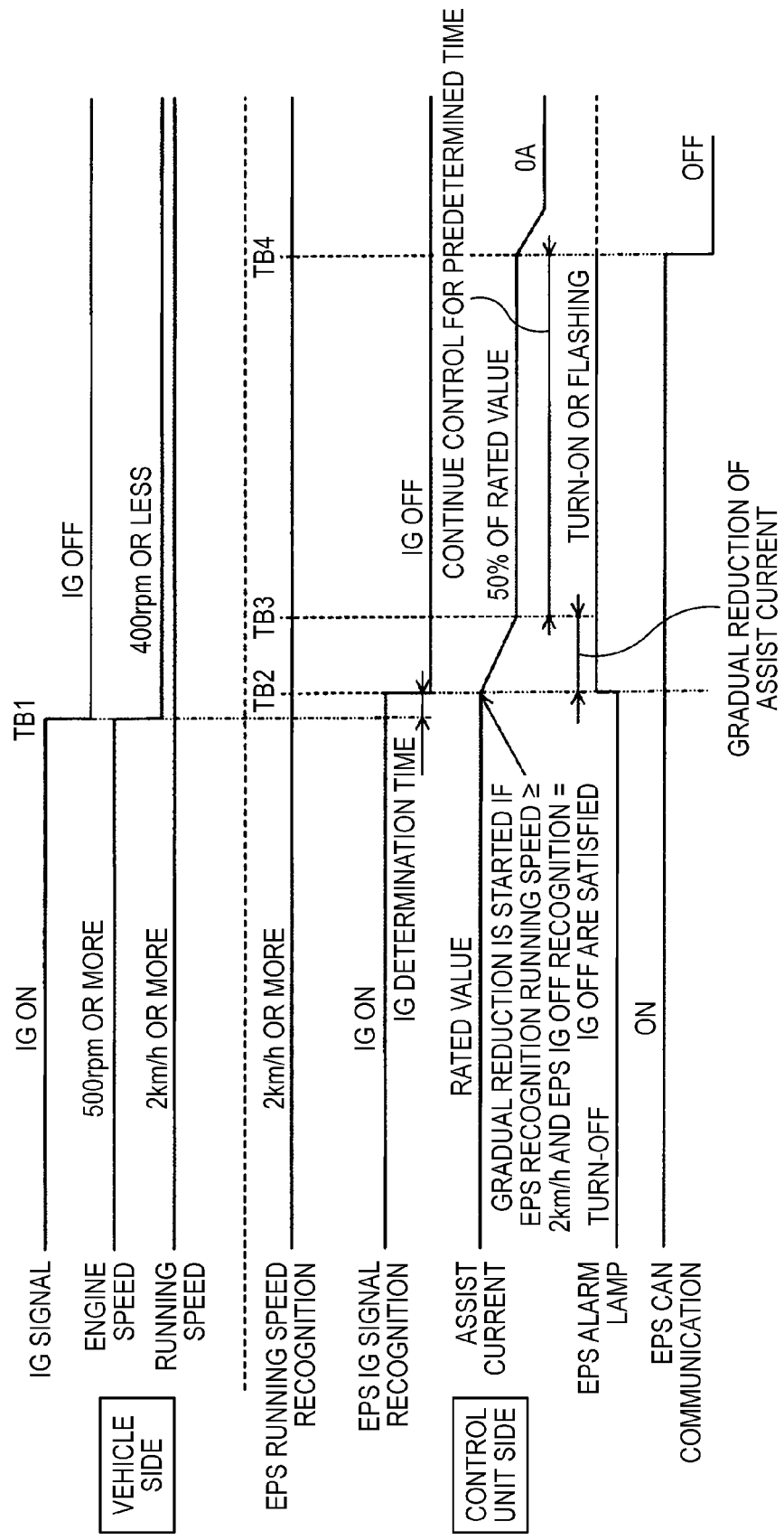
FIG. 6 is a timing chart showing an operation of the electric steering device 20 according to the invention.

Also in the initial situation shown in FIG. 6, the vehicle 10 is in the normal running state. That is, the ignition signal on the vehicle 10 side is in the ON state, an engine speed is 500 rpm or more and a running speed is 2 km/h or more. Further, the recognition state of a running speed in the EPS control unit 206 (control unit) is 2 km/h or more, the recognition state of presence or absence of the ignition signal is ON, the upper limit of supply current to the electric actuator 208 is the rated value (value in the normal assist control), the display state of the alarm lamp is turned-off and the CAN communication in the EPS control unit 206 is in the ON state.

When the ignition switch 104 is turned off at a time point TB1, the ignition signal is switched off, and thus the engine is also stopped (400 rpm or less). In contrast, a running speed is kept to be 2 km/h or more.

Although it is recognized on the EPS control unit 206 side at a time point TB2 that the ignition signal is switched off, as the recognition state of a running speed is 2 km/h or more, the reduced assist control is started. That is, a supply current to the electric actuator 208 is not set to 0 A but is gradually reduced to a reduced assist control value (for example, 50% of the rated value) during a constant time until a time point TB3.

The display control unit 2069 switches the alarm lamp of the display unit 108 in the turned-on state or a flashing state at the time point TB2.

Thereafter, when a predetermined time elapses after starting the reduced assist control (time point TB4), the reduced assist control is terminated and then the assist termination processing is performed. That is, a supply current to the electric actuator 208 is gradually reduced to 0 A during a constant time, and also the EPS control unit 206 switches the CAN communication in the OFF state. As the CAN communication is in the OFF state, display control on the display unit 108 can also not be performed (dotted line in the drawing).

Figure 7:
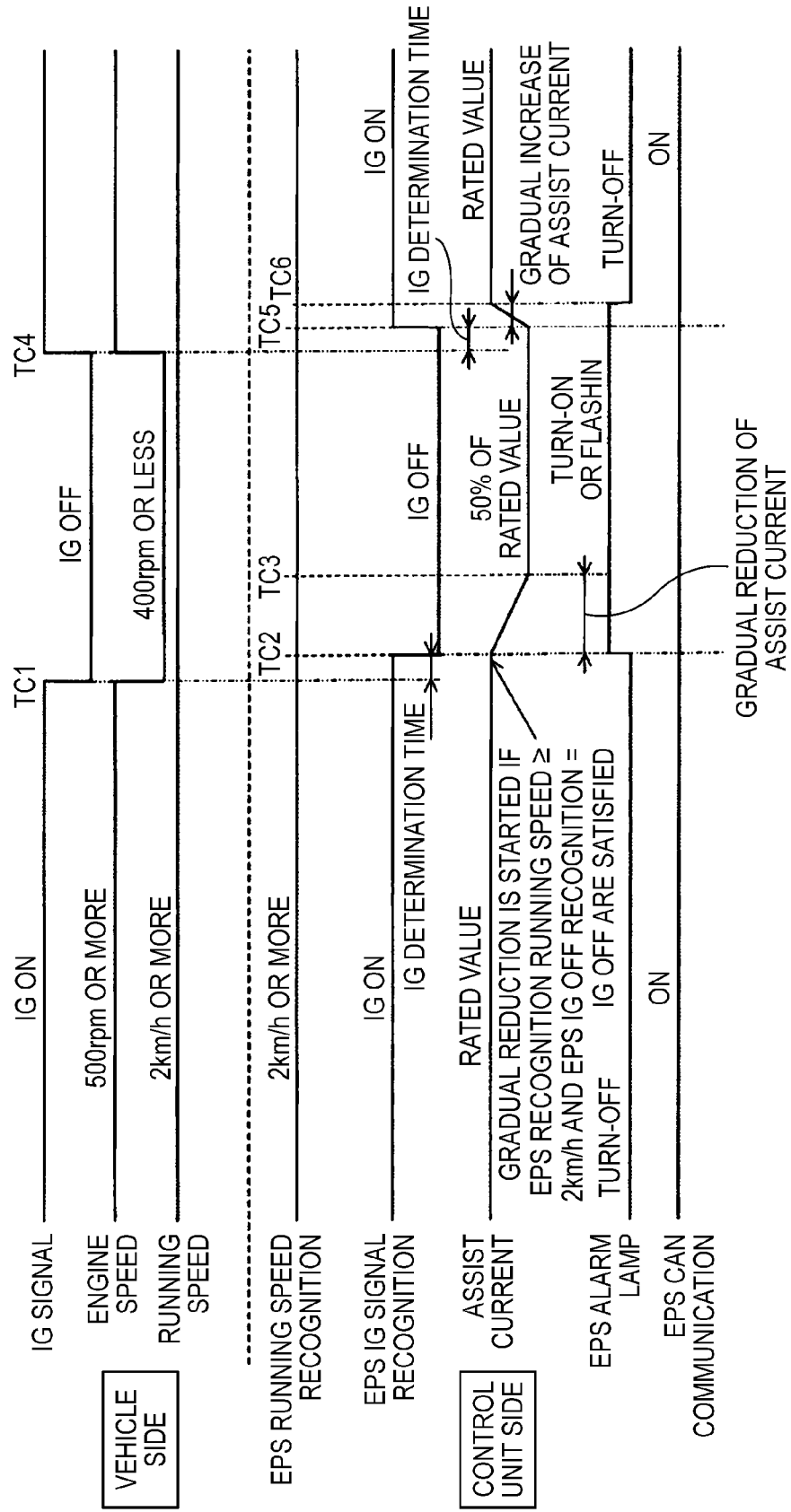
FIG. 7 is a timing chart showing an operation of the electric steering device 20 according to the invention.

The timing chart of FIG. 7 shows an operation in a case that the ignition signal is switched on again after the ignition signal is switched off during running of the vehicle 10.

Also in the initial situation shown in FIG. 7, the vehicle 10 is in the normal running state. That is, the ignition signal of the vehicle 10 side is in the ON state, an engine speed is 500 rpm or more and a running speed is 2 km/h or more. Further, the recognition state of a running speed in the EPS control unit 206 (control unit) is 2 km/h or more, the recognition state of presence or absence of the ignition signal is ON, the upper limit of supply current to the electric actuator 208 is the rated value (value in the normal assist control), the display state of the alarm lamp is turned-off and the CAN communication in the EPS control unit 206 is in the ON state.

When the ignition switch 104 is turned off at a time point TC1, the ignition signal is switched off, and thus the engine is stopped (400 rpm or less). In contrast, a running speed is kept to be 2 km/h or more.

Although it is recognized on the EPS control unit 206 side at a time point TC2 that the ignition signal is switched off, as the recognition state of a running speed is 2 km/h or more, the reduced assist control is started. That is, a supply current to the electric actuator 208 is not set to 0 A but is gradually reduced to the reduced assist control value (for example, 50% of the rated value) during a constant time until a time point TC3.

The display control unit 2069 switches the alarm lamp of the display unit 108 in the turned-on state or the flashing state at the time point TC2.

Thereafter, when the ignition switch 104 is turned on again at a time point TC4, the ignition signal on the vehicle 10 side is switched on and the engine is started (500 rpm or more).

The recognition state of the ignition signal on the EPS control unit 206 side becomes ON at a time point TC5 upon lapse of the IG determination time after the time point TC4. In linkage with this, a current supplied to the electric actuator 208 is increased gradually and becomes the rated value at a time point TC6, thus the normal assist control is stared again.

Further, the display control unit 2069 switches the alarm lamp of the display unit 108 in the turned-off state at the time point TC6.

Figure 8:
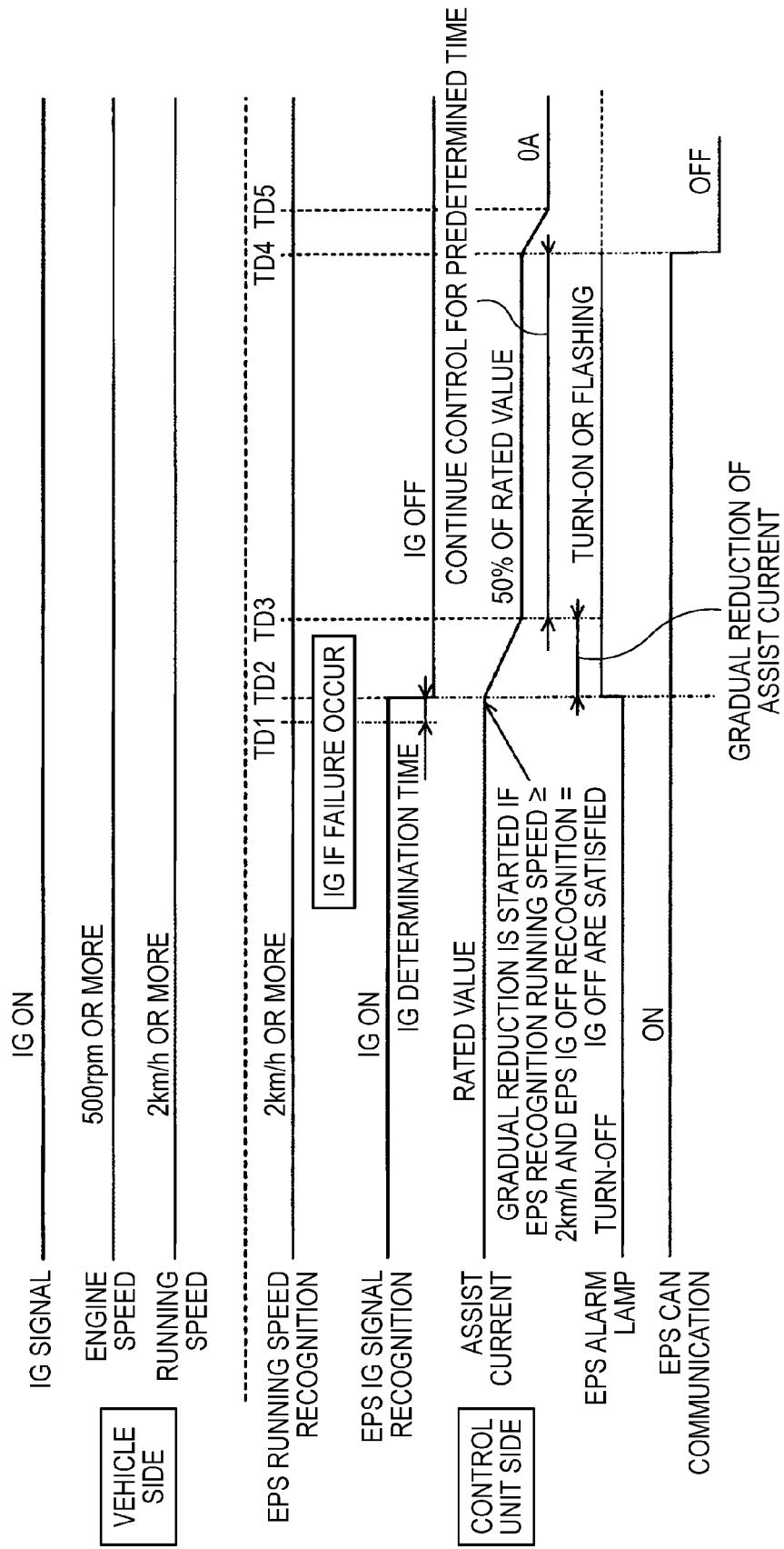
FIG. 8 is a timing chart showing an operation of the electric steering device 20 according to the invention.

The timing chart of FIG. 8 shows an operation in a case that an interface (IG I/F) for detecting the ignition signal becomes failure during running of the vehicle 10.

For example, the failure of the interface for detecting the ignition signal is disconnection between the ignition switch 104 and the EPS control unit 206. Also in the initial situation shown in FIG. 8, the vehicle 10 is in the normal running state. That is, the ignition signal of the vehicle 10 side is in the ON state, an engine speed is 500 rpm or more and a running speed is 2 km/h or more. Further, the recognition state of a running speed in the EPS control unit 206 (control unit) is 2 km/h or more, the recognition state of presence or absence of the ignition signal is ON, the upper limit of supply current to the electric actuator 208 is the rated value (value in the normal assist control), the display state of the alarm lamp is turned-off and the CAN communication in the EPS control unit 206 is in the ON state.

When the interface for detecting the ignition signal becomes failure at a time point TD1, the EPS control unit 206 recognizes at a time point TD2 after the IG determination time that the ignition signal is switched off. At this time, as the ignition signal on the vehicle 10 side is kept in the ON state, the normal running state (an engine speed is 500 rpm or more and a running speed is 2 km/h or more) is continued.

As the recognition state of a running speed in the EPS control unit 206 is 2 km/h or more, the reduced assist control is started. That is, a supply current to the electric actuator 208 is not set to 0 A but is gradually reduced to the reduced assist control value (for example, 50% of the rated value) during a constant time from the time point TD2 to a time point TD3.

The display control unit 2069 switches the alarm lamp of the display unit 108 in the turned-on state or the flashing state at the time point TD2.

Thereafter, when a predetermined time elapses (time point TD4) after starting the reduced assist control, the reduced assist control is terminated and then the assist termination processing is performed. That is, a supply current to the electric actuator 208 is gradually reduced to 0 A during a constant time until a time point TD5, and also the EPS control unit 206 turns off the CAN communication at the time point TD4. As the CAN communication is in the OFF state, display control on the display unit 108 can also not be performed (dotted line in the drawing).

Next, an operation of an electric steering device of a related art will be explained for the sake of comparison with the electric steering device 20 according to the invention.

Figure 9:
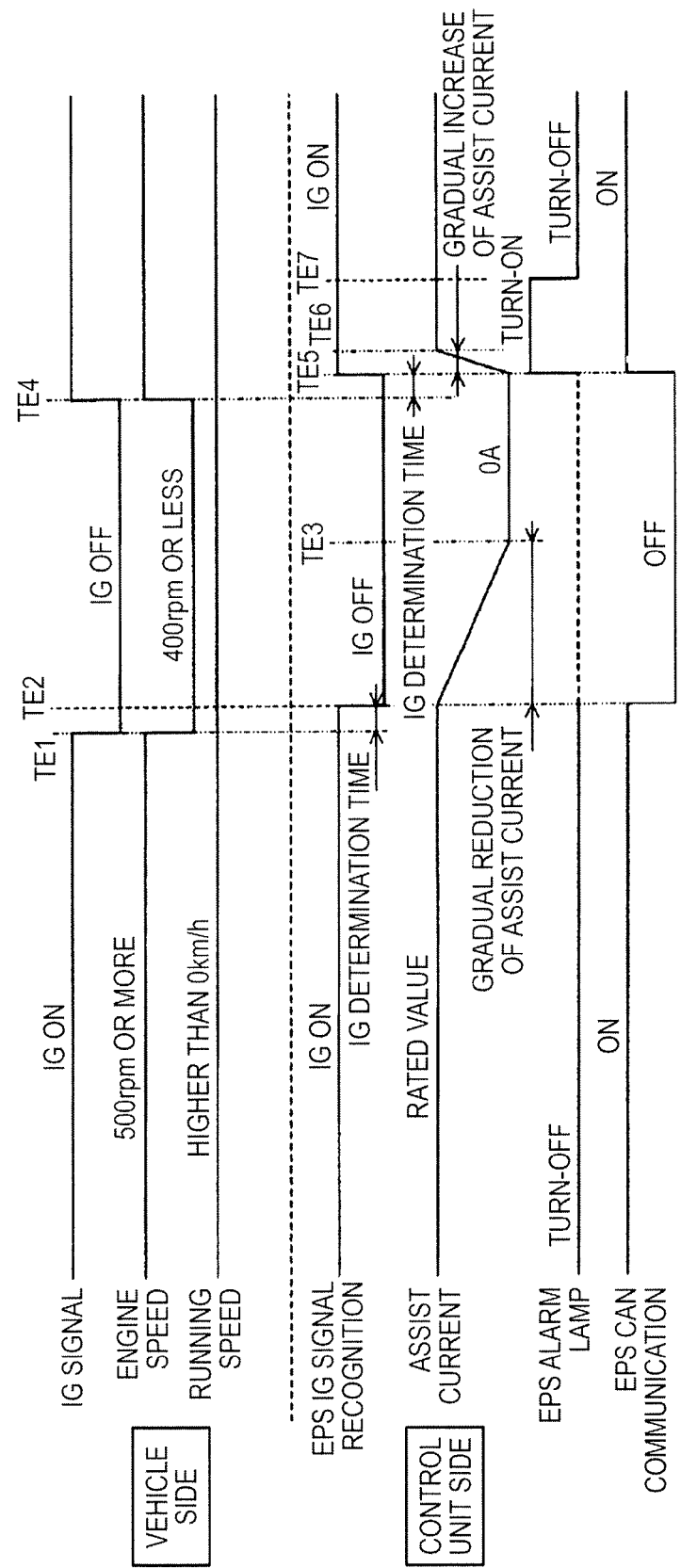
FIG. 9 is a timing chart showing an operation of an electric steering device of a related art.

FIG. 9 is a timing chart showing the operation of the electric steering device of the related art.

FIG. 9 differs from the present invention (see FIGS. 5 to 8) in a point that the EPS control unit 206 does not recognize a running speed.

Also in the initial situation shown in FIG. 9, the vehicle 10 is in the normal running state. That is, the ignition signal on the vehicle 10 side is in the ON state, an engine speed is 500 rpm or more and a running speed is 2 km/h or more. Further, the recognition state of presence or absence of the ignition signal in the EPS control unit 206 (control unit) is ON, the upper limit of supply current to the electric actuator 208 is the rated value (value in the normal assist control), the display state of the alarm lamp is turned-off and the CAN communication in the EPS control unit 206 is in the ON state.

When the ignition switch 104 is turned off at a time point TE1, the ignition signal is switched off, and thus an engine speed reduces (400 rpm or less). In contrast, a running speed is kept to be higher than 0 km/h.

When the EPS control unit 206 side recognizes that the ignition signal is switched off at a time point TE2 (time point TE1+IG determination time), the assist termination processing is started. That is, a current supplied to the electric actuator 208 is reduced gradually to 0 A during a constant time until a time point TE3. Further, the EPS control unit 206 switches the CAN communication in the OFF state at the time point TE2. As the CAN communication is in the OFF state, display control on the display unit 108 can also not be performed (dotted line in the drawing).

During this period, as a steering assist force is not generated at all, a large force is required for the steering operation.

Thereafter, when the ignition switch 104 is turned on again at a time point TE4, the ignition signal is switched on and thus the engine is started (500 rpm or more).

The recognition state of the ignition signal on the EPS control unit 206 side becomes ON at a time point TE5 (time point TE4+IG determination time). In linkage with this, the EPS control unit 206 switches the CAN communication in the ON state. Further, a current supplied to the electric actuator 208 is increased gradually and becomes the rated value at a time point TE6. Thus, the normal assist control is started again.

Further, the display control unit 2069 switches the alarm lamp of the display unit 108 in the turned-on state for initial checking for a constant time (from the time point TE5 to a time point TE7).

As described above, in a case that the ignition signal of the vehicle 10 is not detected and a running speed of the vehicle 10 is the predetermined speed or more, that is, in a case that the ignition signal is most probably switched off against an intension of a diver during running of the vehicle 10, the electric steering device 20 according to the embodiment reduces the upper limit of a steering assist force generated in the electric actuator than the case that the ignition signal is detected (normal assist control).

By doing so, it is possible to avoid occurrence of such a phenomenon that the driving of the electric steering device 20 is stopped completely and hence the steering operation becomes difficult. Further, as a steering assist force becomes smaller than the case of the normal assist control, a driver can easily notice a trouble (erroneous operation or failure) of the vehicle.

The electric steering device 20 calculates a steering assist force in the reduced assist control by multiplying the upper limit of a steering assist force generated in the normal assist control by the correction coefficient smaller than 1. Thus, for example, even in a case that the upper limit of a steering assist force changes depending on the running state, a steering assist force in the reduced assist control can be determined easily.

Further, the electric steering device 20 changes a steering assist force depending on a running speed, and also generates a steering assist force at each of the respective running speeds in the reduced assist control by multiplying a steering assist force generated at each of the respective running speeds by the correction coefficient. Thus, it becomes possible to prevent occurrence of such a phenomenon that, when a running speed changes, a steering assist force changes excessively to impair steering stability.

Further, the electric steering device 20 reduces a steering assist force as a running speed becomes higher. Thus, as the steering wheel becomes heavier at a high speed running, straight running stability can be improved.

Further, if a situation that the ignition signal is not detected and a running speed is the predetermined speed or more is continued for a predetermined time or more, the electric steering device 20 stops generation of a steering assist force. Thus, a driver can more easily notice a trouble (erroneous operation or failure) of the vehicle 10. Further, for example, even in a case that an acquired running speed is erroneous and the vehicle 10 (engine) is stopped actually, it is possible to avoid occurrence of such a phenomenon that a charged amount of the battery 106 reduces and then battery exhaustion occurs.

What is claimed is:

1. An electric steering device comprising:
   an electric actuator which generates a steering assist force for a steering mechanism of a vehicle,
   a control unit which controls the steering assist force generated from the electric actuator based on a steering operation by a driver,
   an ignition signal detection unit which detects presence or absence of an ignition signal of the vehicle,
   a speed acquisition unit which acquires a running speed of the vehicle, and
   an output control unit which changes the steering assist force depending on the running speed of the vehicle such that an upper limit of the steering assist force is the steering assist force at a predetermined speed,
   wherein, in a case that the ignition signal is not detected and the running speed is equal to or larger than a predetermined speed, the control unit reduces the upper limit of the steering assist force generated from the electric actuator so as to be smaller than the upper limit of the steering assist force in a case that the ignition signal is detected.

2. The electric steering device according to claim 1, wherein
   in the case that the ignition signal is not detected and the running speed is equal to or larger than the predetermined speed, the control unit multiplies the upper limit of the steering assist force generated in the case that the ignition signal is detected by a correction coefficient smaller than 1 so that the upper limit is reduced so as to be smaller than the upper limit in the case that the ignition signal is detected.

3. The electric steering device according to claim 2, wherein
   the control unit changes the steering assist force depending on the running speed, and multiplies the steering assist force generated at each of the respective running speeds by the correction coefficient so that the steering assist force generated at each of the respective running speeds is reduced so as to be smaller than the upper limit in the case that the ignition signal is detected.

4. The electric steering device according to claim 3, wherein
   the control unit changes the correction coefficient depending on the running speed.

5. The electric steering device according to claim 4, wherein
   the higher the running speed is, the smaller the steering assist force is set by the control unit.

6. The electric steering device according to claim 1, wherein
   in a case that the ignition signal is not detected and the running speed is equal to or larger than the predetermined speed is continued for a predetermined time or more, the control unit stops generation of the steering assist force by the electric actuator.

7. The electric steering device according to claim 2, wherein
   in a case that the ignition signal is not detected and the running speed is equal to or larger than the predetermined speed is continued for a predetermined time or more, the control unit stops generation of the steering assist force by the electric actuator.

8. The electric steering device according to claim 3, wherein
in a case that the ignition signal is not detected and the running speed is equal to or larger than the predetermined speed is continued for a predetermined time or more, the control unit stops generation of the steering assist force by the electric actuator.

9. The electric steering device according to claim 4, wherein
in a case that the ignition signal is not detected and the running speed is equal to or larger than the predetermined speed is continued for a predetermined time or more, the control unit stops generation of the steering assist force by the electric actuator.

10. The electric steering device according to claim 5, wherein
in a case that the ignition signal is not detected and the running speed is equal to or larger than the predetermined speed is continued for a predetermined time or more, the control unit stops generation of the steering assist force by the electric actuator.

11. The electric steering device according to claim 1, wherein
the control unit reduces the upper limit so as to be larger than a lower limit where no steering assist force is provided.

12. The electric steering device according to claim 1, wherein
the control unit determines whether or not the running speed of the vehicle is equal to or larger than the predetermined speed.

13. The electric steering device according to claim 12, wherein
the control unit determines that the running speed is smaller than the predetermined speed, an assist termination processing is performed.

14. The electric steering device according to claim 1, wherein
the predetermined speed is near 0 Km/h.

* * * * *